No. 793,720. PATENTED JULY 4, 1905.
E. L. GODBE.
APPARATUS FOR SEPARATING SLIMES, &c., FROM METAL BEARING SOLUTIONS.
APPLICATION FILED AUG. 6, 1904.
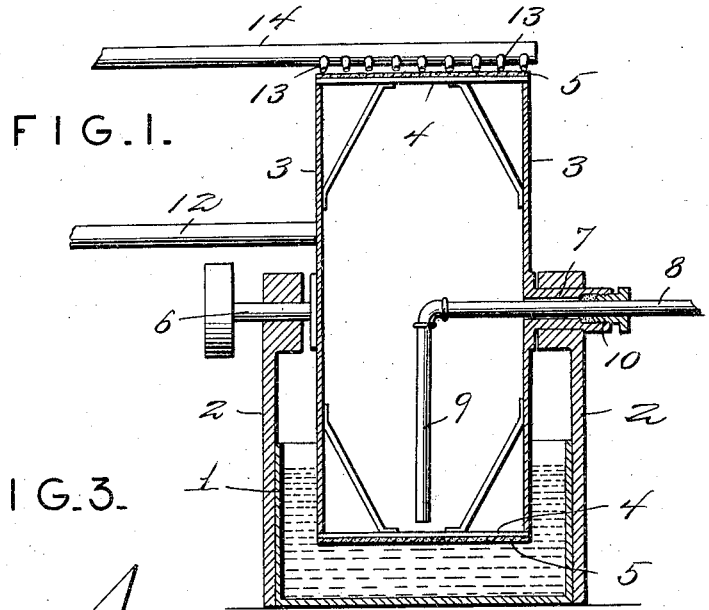
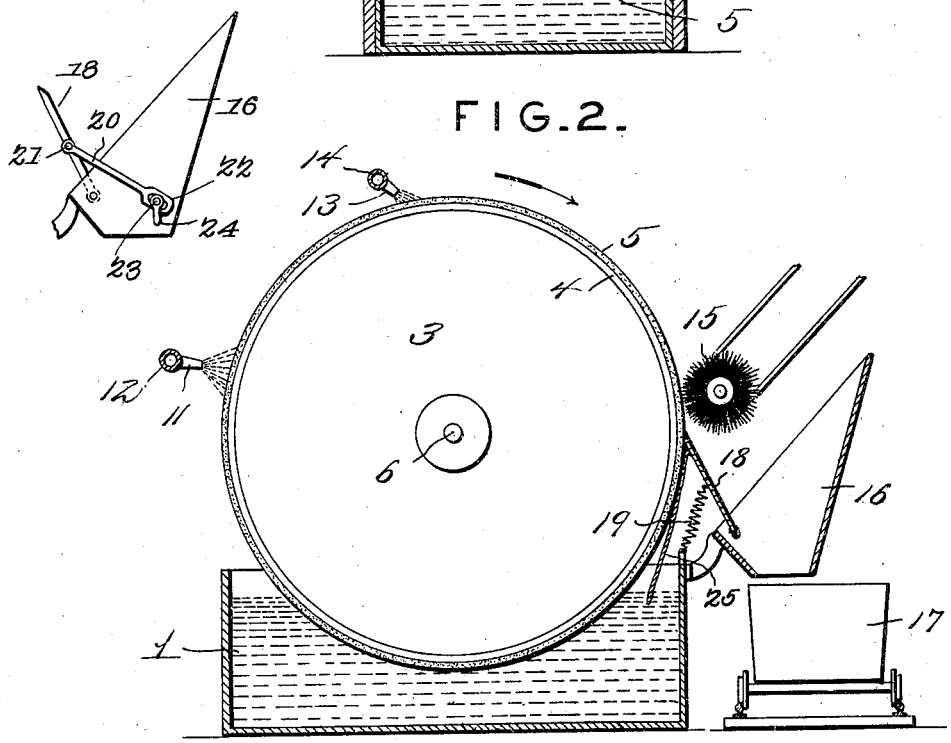
Witnesses:
E. F. Stewart
R. M. Elliott
Ernest L. Godbe, Inventor,
by C. A. Snow & Co.
Attorneys.

No. 793,720.       Patented July 4, 1905.

UNITED STATES PATENT OFFICE.

ERNEST L. GODBE, OF SALT LAKE CITY, UTAH.

APPARATUS FOR SEPARATING SLIMES, &c., FROM METAL-BEARING SOLUTIONS.

SPECIFICATION forming part of Letters Patent No. 793,720, dated July 4, 1905.

Application filed August 6, 1904. Serial No. 219,760.

*To all whom it may concern:*

Be it known that I, ERNEST L. GODBE, a citizen of the United States, residing at Salt Lake City, in the county of Salt Lake and State of Utah, have invented a new and useful Apparatus for Separating Slimes, &c., from Metal-Bearing Solutions, of which the following is a specification.

This invention relates to an apparatus for separating slimes, &c., from metal-bearing solutions.

The object of the invention is in a rapid, ready, thoroughly-feasible, and practical manner to effect separation of slimes, pulverized ore, or the like from a metal-bearing solution and to conserve such solution.

With the above and other objects in view, as will appear as the nature of the invention is better understood, the same consists in the novel construction and combination of parts of an apparatus for separating slimes, &c., from metal-bearing solutions, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in end elevation, partly in section. Fig. 2 is a view in side elevation, partly in section. Fig. 3 is a detail view in elevation of a part of the apparatus.

Referring to the drawings, 1 designates a tank, which may be made of any suitable material and is designed to contain slimes, pulverized ores, and a metal-bearing solution. These substances may be supplied to the tank in any preferred manner, and as this is not material to the present invention detailed illustration of such supplying means is omitted.

Supported by suitable standards 2, arranged exterior of the tank, is a drum or cylinder comprising heads 3 and a rim 4. This cylinder may be made of any suitable material; but by preference the heads will be made of sheet-iron and the rim or periphery 4 of open-work metal, such as metallic bars, heavy wire-netting, wooden strips, or the like. The exact materials of which the drum is to be constructed is immaterial, and therefore no particular stress is to be laid thereto. The periphery is covered with a suitable filtering medium 5, which may be of porous metal, a glass filtering medium, a stone filtering medium, or one made of cloth or other suitable textile fabric, the filtering medium being secured in any preferred manner to the rim. Where fabric is used, it may be covered by a wire-netting to protect it from wear. The drum is supported by trunnions 6 and 7, which work in suitable bearings in the standards, and is driven from any preferred source of power. (Not necessary to be shown.) The trunnion 7 is hollow and has projecting through it a pipe 8, which extends into the drum, preferably about midway of its width, and has connected with its inner end a downward-projecting extension 9, the terminal of which is disposed close to the lower side of the drum, a liquid-tight juncture between the pipe and the trunnion being secured by a stuffing-box 10 of the usual or any preferred construction. The pipe 8 connects with a vacuum or suction pump, (not necessary to be shown;) the function of which is to exhaust air from the interior of the drum, and the suction resulting therefrom causes the solution to be drawn into the drum and the slimes, &c., to adhere tenaciously to the filtering-surface. During the revolution of the drum the adhering slimes are first sprayed with a solution of potassium cyanid, if that be the agent employed to effect the solution of the metals, and then with water, the action of both of which liquids, which wash through the filter, being to displace the metal-bearing solution contained in the layer of slimes adhering to the filtering medium. The potassium cyanid or other solution is discharged through a series of nozzles 11, fed from a pipe 12, leading to a suitable source of supply, and the water is discharged through a series of nozzles 13, fed from a pipe 14, leading to a suitable source of supply. The slimes, &c., adhering to the filtering medium will vary in thickness from one-sixteenth of an inch to one-quarter or one-half inch, and it is essential that these should be removed in order to render the operation of the drum continuous. To effect this, there is provided a revoluble brush 15, which operates to remove the slimes, &c., and deposit them into a hopper 16, disposed over a car 17, which is provided for the purpose of removing the tailings as requisite. In order to insure removal of the slimes, &c., from the drum, a scraper 18 is provided, the lower end of which is connected in any preferred manner to one of the walls of the hopper 16 or to any other suitable support and the upper end of which bears against the cylinder. To insure proper coaction between the scraper and the cylinder, a spring 19 is provided, which is connected at one end to the tank and at the opposite end to the scraper. As will be obvious, a weight may be employed in lieu of the spring, and as this is a well-known equivalent illustration is omitted. This scraper removes all the slimes, &c., left upon the drum by the brush 15 and deposits them down the hopper and into the car. If preferred, the revolving brush may be omitted and a stationary one be employed, or both a stationary and a revoluble brush may be utilized, as will readily be apparent, or both revoluble and stationary brushes may be omitted and the slimes be removed by the scraper alone.

In some instances it may be preferred to allow a thin film of slime to adhere to the filter while in operation, and to effect this result means is provided for adjusting the scraper to and from the filter for this purpose. This adjustment may be secured in various ways and is herein shown as being effected by the employment of a pair of arms 20, only one of which is shown in Fig. 3, one end of each of which is pivotally secured at 21 to the scraper at or near its upper end and the other end of each of which is extended down against the outside of the hopper and provided with a slotted head 22, through which extends a bolt 23, engaged by a lever 24. It will be seen by loosening the lever and moving the scraper that the desired adjustment may be secured, and upon tightening the lever 24 the scraper will be positively held against accidental loosening. The provision of this adjusting means for the scraper is of importance, inasmuch as it obviates wear of the filtering medium and also of the scraper.

Where the form of scraper shown in Fig. 2 is employed, the surface of the filtering medium from the scraper down to the material in the tank will be kept clean or devoid of slimes, and this will operate to destroy the suction within the drum, and to obviate this an apron 25, of canvas or rubber cloth, is employed, one end of which is secured in this instance to the scraper and the other end of which dips into or lies upon the surface of the material in the tank. The suction within the drum will cause the apron to cling to the filter-surface with sufficient tenacity to preclude entrance of air, so that a vacuum or partial vacuum will always be maintained so long as the apparatus is in operation. This apparatus is also adapted for filtering or leaching slimes or pulverized ores in layers not exceeding one-half inch in thickness.

The slimes, pulverized ore, and a metal-bearing solution being supplied to the tank 1, the drum is started, and at the same time the suction or vacuum apparatus connecting with the pipe 8 begins its operation. As the air is exhausted from the drum a partial vacuum is formed therein, which causes the metal-bearing solution to be drawn into the drum and at the same time the slimes, &c., to adhere to the exterior of the drum. As the lower end of the extension 9 is located close to the bottom of the drum, the metal-bearing solution will be sucked up and led to the pump, where it is discharged into a suitable receptacle. As the rotation of the drum continues the slimes, &c., adhering to its filtering-surface are subjected first to the potassium-cyanid bath or other solution and then to the water-bath, and as both the solution and water enter the drum they tend to displace the metal-bearing solution remaining in the layer of slimes. During the rotation of the drum the slimes, &c., are removed from its exterior by the brush and the scraper in the manner described or by either alone. The operation of the device is continuous and very rapid and will effectively and cheaply accomplish the object designed.

While it is preferable to employ spraying mechanism in combination with the filter, it is to be understood that the invention is not to be limited thereto, as the spraying may be omitted and the slimes, &c., be removed by brushes, scrapers, or the like without any spraying, as described.

Instead of making the filter in the form of a drum and having a single suction-pipe the drum, which may be termed a "collector," may be made in the form of a wheel, the rim having filtering-surfaces combined therewith, the spokes being made hollow to convey the solution from the rim to the hub, which latter will communicate with a pipe leading to the suction or vacuum pump.

It is to be understood that while only one series of nozzles for the cyanid solution and one for the water is shown the invention is not to be limited in this particular, as there may be two or more spray-nozzles for the solution and for the water and still be within the scope of the invention.

Having thus described the invention, what is claimed is—

An apparatus of the class described comprising a tank, a revoluble drum working therein, a filtering medium fixed to the periphery of the drum, suction mechanism coacting with the interior of the drum, a scraping device coacting with its exterior, and an apron depending from the scraper adjacent to the face of the filtering medium and entering the tank to maintain a vacuum within the drum.

In testimony that I claim the foregoing as my own I have hereto affixed my signature in the presence of two witnesses.

ERNEST L. GODBE.

Witnesses:
  E. A. WILSON,
  CHAS. W. BOYD.